Jan. 9, 1923.
A. L. AUSTIN.
RESILIENT NONINFLATABLE TIRE.
FILED OCT. 29, 1919.
1,441,654.
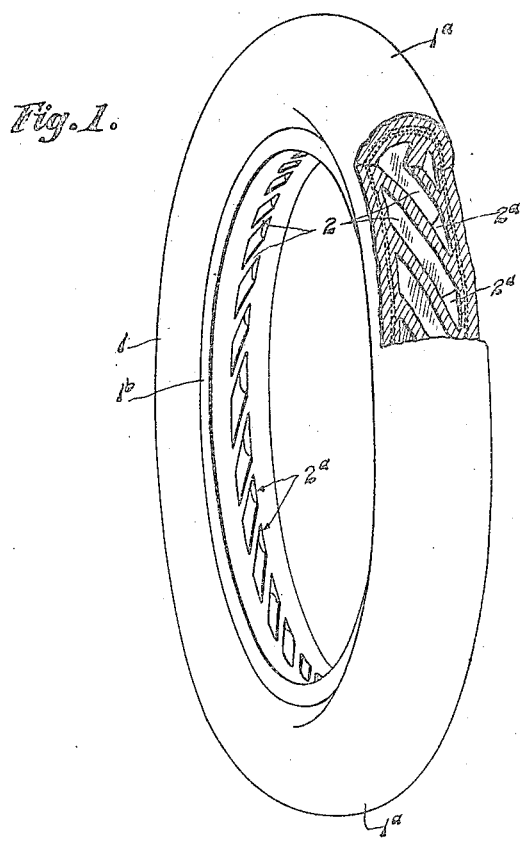
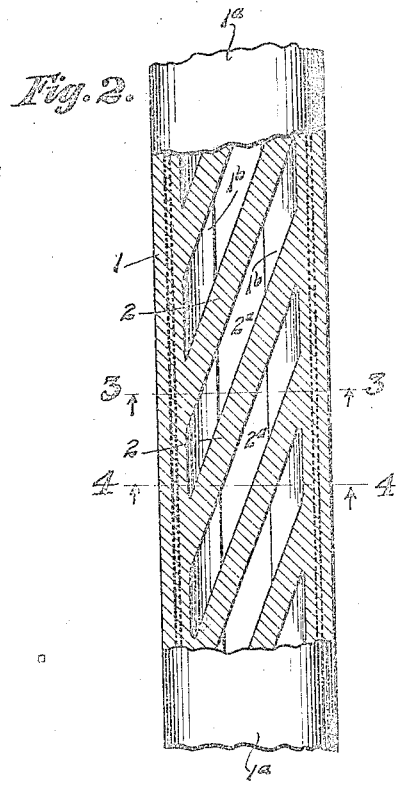
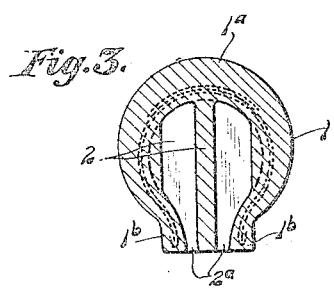
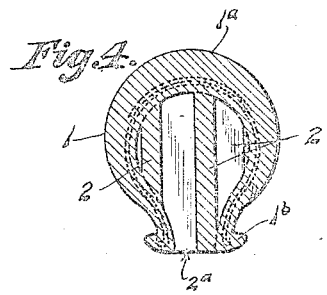
Inventor
Albert L. Austin
By
Attorney Patented Jan. 9, 1923.

1,441,654

UNITED STATES PATENT OFFICE.

ALBERT L. AUSTIN, OF CLEVELAND, OHIO.

RESILIENT NONINFLATABLE TIRE.

Application filed October 29, 1919. Serial No. 334,295.

*To all whom it may concern:*

Be it known that I, ALBERT L. AUSTIN, a citizen of the United States, residing at Cleveland, in the county of Cuyahoga and State of Ohio, have invented certain new and useful Improvements in Resilient Noninflatable Tires, of which the following is a specification.

My invention relates to improvements in resilient non-inflatable tires, the improved tire embodying improved transversely inclined web members carried within the tire casing in lieu of the ordinary inner tube with its chamber of compressed air and being designed to impart the requisite resiliency to the tire as a whole in taking up or absorbing obstructions and shocks similar to the ordinary pneumatic tire, but without the attendant liability to punctures, blowouts and the like.

The primary object of the invention is to provide a generally improved resilient tire of this class which will be exceedingly simple in construction, cheap of manufacture and efficient in use.

A further object of the invention is the provision of an elastic non-inflatable tire of suitable resilient material, such as rubber, or the like, made up of a suitable tire casing and interiorly arranged substantially regularly spaced relatively movable web members connected to the tread heel and side portions of the tire casing.

A still further object is the provision of a generally improved non-inflatable or so-called "airless" tire through the provision of improved internally arranged cushioning and reinforcing web members so constructed, arranged and disposed relatively to each other and the tire tread and heel portions of the tire that the general line or plane of compression at the tread or contact portion of the tire with the subjacent surface or roadway will be uniformly received on a plurality of said web members in the form of a general edgewise compression on two or more of said web members at the same time, the arrangement being such that as the general center of the plane of compression is beneath the center of one web and moved forwardly by the rotation of the tire and over the remaining or half portion of such web and the terminal portion of an adjacent web, the plane of compression is also being carried over the initial portion of the opposite side or adjacent web so that a uniform resiliency is imparted by the tire as a whole. The above arrangement and connection of the web members also enables the latter to better receive and cushion the circumferential strains and stresses given to the tire during the active traction or braking movements on the traction wheels, and reduces to a minimum any liability of the webs to break away from the tire casing, as contra-distinguished from a general transverse arrangement of the internally arranged reinforcing and cushioning webs or elements heretofore attempted in tire cores or fillers.

With the above mentioned and other ends in view, the invention consists in the novel construction, arrangement and combination of parts, hereinafter described, illustrated in some of its embodiments in the accompanying drawings, and particularly pointed out in the appended claims.

Referring to the drawings, forming a part of this specification, Figure 1, is a perspective view of a tire of the straight sided heel type constructed in accordance with my invention, a portion of the casing walls and reinforcing and cushioning web members being cut away and shown in section for the purpose of clearer illustration of the parts.

Fig. 2, an enlarged fragmentary view of the same, partly in plan and partly in central longitudinal section.

Fig. 3, a cross sectional view of the same, taken on line 3—3 of Fig. 2.

Fig. 4, a cross sectional view of the same, taken on line 4—4 of Fig. 2, and showing my invention embodied in a tire of the clencher or beaded heel type.

Similar numerals of reference designate like parts throughout all the figures of the drawings.

The tire casing or shoe 1, may be of any suitable and convenient form and comprises a tread portion 1ª, with suitable side walls terminating in tire heel members 1ᵇ. The heel members 1ᵇ, may be of the straight sided type, as shown in Figs. 1 to 3, inclusive, of the drawings, or, if desired, may be of the clencher or beaded type, as shown in Fig. 4, of the drawings.

As a means of connecting, reinforcing and cushioning and strengthening the various tire parts, and particularly as a means of providing for uniform resiliency to the tire body as a whole, the tire casing is provided with a plurality of internally arranged radially extending transversely inclined web members 2.

By reason of the transverse inclination of the web members the latter are of elongated disc or curved ellipsoidal shape, as shown most clearly in Fig. 1, of the drawings, the web members being arcuately curved with respect to the wheel or tire center and spaced apart forming intervening air spaces or pockets $2^a$, said air spaces or pockets $2^a$, extending vertically from the tread portions of the tire and communicating with the heel portions thereof, as shown most clearly in said Fig. 1, of the drawings.

When mounted upon the wheel rim the air spaces $2^a$, will be closed and sealed, or substantially so. The web members 2, and air pockets $2^a$, are adapted to afford the requisite resiliency to the tire as a whole in taking up or absorbing shocks similar to the ordinary pneumatic tire, and the webs 2, are also adapted to receive the lateral and circumferential strains and stresses on the tire or casing, as well as to provide the requisite resiliency between the various parts in supporting the superposed load on the tire.

The transversely inclined supporting and connecting webs 2, are preferably arranged in radially extending planes, as shown, so as to directly receive an endwise compression at at the contact portion at the tread of the tire with the subjacent surface or roadway, and as a means of uniformly distributing the resistance and resiliency offered by such spaced web members 2, the latter are preferably elongated in curved or arcuate ellipsoidal form and transversely inclined so that the transverse central line of compression, as indicated at the line 3—3 of Fig. 2, of the drawings, will always rest upon or include a plurality of the web members 2, and it will be obvious upon reference to said Fig. 2, of the drawings, that as the tires move in the direction indicated by the arrows, the line of compression being as indicated at 3—3, or at the center of one of the web members and upon being moved forwardly by the rotation of the tire it will be observed that as the line of compression is moved over the last half or portion of the central web member and the remaining portion of an adjacent web member, it is being carried over the initial and first portion of the opposite or adjacent side web member so that a uniform resiliency is constantly given to the tire as a whole.

It will also be observed upon reference to Figs. 1, 3 and 4, of the drawings that the spaced web members 2, not only extend between the walls of the tire casing, but that the same are connected to and bridge the space between the heel portions of the tire and extend flush with such heel portions whereby all of the tire parts or walls are resiliently connected and reinforced and the line of tread compression on the tread portion of the tire is uniformly received and cushioned edgewise on a plurality of such web members. It will also be observed that the form and relation of the web members to each other and to the adjacent walls of the casing are such as to cause the same to uniformly receive the plane or line of tread compression on a plurality of said webs and to cause the latter to receive and cushion the circumferential strains and stresses given to the tire as a whole when used on a traction wheel during active tractive movements or during braking movements of such traction wheels.

From the foregoing description, taken in connection with the accompanying drawings, the operation and advantages of my invention will be readily understood.

Having thus described some of the embodiments of my invention, without having attempted to set forth all the forms in which it may be made, or all the modes of its use, what I claim and desire to secure by Letters Patent, is,—

1. A non-inflatable tire casing having spaced heel members and transversely inclined parallel extending resilient connecting web members within and integral with said tire casing and bridging the space between and extending flush with said heel members.

2. A non-inflatable tire casing having spaced heel members and provided with a plurality of transversely inclined parallel extending resilient curved ellipsoidal webs extending radially between the tread and heel portions of the tire and bridging the space between the side and heel portions thereof.

3. A resilient non-inflatable tire, comprising a tire casing including a tread portion and spaced heel members, and transversely inclined curved ellipsoidal web members within and connected to said casing bridging the space between said heel members whereby all of said tire casing parts are resiliently connected and reinforced and the line of tread on said tread portion of the tire is uniformly received and cushioned edgewise on a plurality of said web members.

4. A non-inflatable tire, including tread and heel portions, said tire being provided with spaced resilient ellipsoidal shaped web members forming intervening air pockets extending from the tread to and between the heel portions thereof, said ellipsoidal shaped webs being so circumferentially disposed and spaced relative to each other and said tread and heel portions as to uniformly receive the plane of tread compression on a plrality of said webs whereby the latter will receive the circumferential strains given to the tire during service.

5. A non-inflatable tire, including tread and heel portions provided with spaced resilient connecting ellipsoidal webs forming intervening air pockets communicating with said heel portions of said tire, said webs being so radially and circumferentially disposed and spaced relative to each other and to said tread and heel portions as to uniformly receive the plane of tread compression in the form of a general edgewise compression on a plurality of said webs and to cause the latter to receive and cushion the circumferential strains and stresses given to the tire as a whole during traction service.

In testimony whereof I have affixed my signature.

ALBERT L. AUSTIN.